United States Patent [19]

Misono

[11] Patent Number: 5,231,129
[45] Date of Patent: Jul. 27, 1993

[54] RUBBER COMPOSITION

[75] Inventor: Shinji Misono, Gotenba, Japan

[73] Assignee: Tokai Carbon Co., Ltd., Tokyo, Japan

[21] Appl. No.: 872,370

[22] Filed: Apr. 23, 1992

[30] Foreign Application Priority Data

Apr. 25, 1991 [JP] Japan .................. 3-122759

[51] Int. Cl.$^5$ .............................. C08K 3/04
[52] U.S. Cl. ................... 524/496; 524/495; 423/445
[58] Field of Search .......... 524/495; 423/445

[56] References Cited

U.S. PATENT DOCUMENTS

| | | | |
|---|---|---|---|
| 4,281,703 | 8/1981 | Ahmad | 524/496 |
| 4,786,680 | 11/1988 | Suzuki et al. | 525/237 |
| 4,871,794 | 10/1989 | Itoh et al. | 524/495 |
| 4,914,147 | 4/1990 | Mouri et al. | 524/495 |
| 5,093,407 | 3/1992 | Komai et al. | 524/495 |
| 5,124,396 | 6/1992 | Branan, Jr. et al. | 524/495 |

FOREIGN PATENT DOCUMENTS

| | | | |
|---|---|---|---|
| 2290738 | 12/1987 | Japan | 524/495 |
| 2290739 | 12/1987 | Japan | 524/495 |
| 9110618 | 7/1991 | PCT Int'l Appl. | 524/495 |

*Primary Examiner*—Paul R. Michl
*Assistant Examiner*—Olga Asinovsky
*Attorney, Agent, or Firm*—Armstrong, Westerman, Hattori, McLeland & Naughton

[57] ABSTRACT

A rubber composition comprising 100 parts by weight of a rubber ingredient compounded with 35-100 parts of a carbon black, said carbon black having a nitrogen adsorption specific surface area ($N_2SA$) of 60-160 $m^2g$ and a dibutyl phthalate adsorption number (DBP) of 90-150 ml/100 g, and the intraaggregate mode diameter (Dp mode diameter) of the carbon black satisfying the following formula:

Dp mode diameter $\geq 75.2 \times (DBP/N_2SA) + 8.0$ wherein the Dp mode diameter refers to a mode diameter at the maximum frequency in the pore diameter distribution of carbon black particles measured by means of a differential scanning calorimeter (DSC).

1 Claim, No Drawings

RUBBER COMPOSITION

BACKGROUND OF THE INVENTION

The present invention relates to a rubber composition suitable for use as a tire tread rubber, and more particularly to a rubber composition capable of giving an improved abrasion resistance to tire tread while retaining its low heat build-up.

As a result of the enhancement in the performances of automobiles in the recent years, more improved high-speed traveling performances, stability performances and durability performances have come to be waited for. Thus, it is currently important problem to improve the characteristic properties of tire tread with respect to these performances, and particularly to improve abrasion resistance without increasing its heat build-up. Further, in order to cope with the social demands such as saving of resources, energies, etc., low fuel consumption tires are being studied energetically. This problem also makes it indispensable to give the rubber constituting a tire tread a high resilience and thereby lower its heat build-up.

Generally speaking, the performances of rubber, such as abrasion resistance, heat build-up and the like, are largely dependent on the characteristic properties of the carbon black to be compounded thereinto. It is known that these characteristics of rubber have an antinomic character.

For example, in lowering the heat build-up of a tire to thereby make a low fuel consumption tire, it is effective to compound a small quantity of a carbon black of relatively large particle size into a rubber. However, if the quantity of carbon black is small, some characteristic properties of tire, such as abrasion resistance, braking performance on wet road surface and the like, are deteriorated unavoidably.

When a tire tread is required to have a high abrasion resistance under severe traveling conditions, it is effective to compound a carbon black having as small a size as possible and a large structure. However, such of carbon black enhances the heat build-up of a rubber composition, so that it has the danger of promoting, for example, the breakage of the inner structure of a tire due to the accumulation of heat in the course of traveling and the aging of the materials constituting the tire.

Thus, there has been proposed a number of techniques simultaneously aiming at an improvement in abrasion resistance and a reduction of heat build-up by microscopically studying the fundamental properties of carbon black, such as particle size (specific surface area), structure, etc., and other properties, screening out a carbon black of specified properties, and compounding such a carbon black into a rubber.

For example, regarding the carbon black of N 339 class frequently used as a tire tread for passenger cars and light-weight trucks, the following proposals have been made.

(1) A carbon black for rubber formulation, wherein the nitrogen adsorption specific surface area ($N_2SA$) is 60 $m^2/g$ or above, the dibutyl phthalate absorption number (DBP) of a compressed sample is not lower than 112 ml/100 g, and the Stokes mode diameter and its distribution of carbon black aggregate are not smaller than specified values (Japanese patent application Kokoku publication No. 1-53978).

(2) A rubber composition containing a carbon black, wherein the $N_2SA$ of the carbon black is 60 $m^2/g$ or above, the DBP is 108 ml/100 g or above, the true specific gravity per unit specific surface area is preset in a specified range much lower than that of known carbon blacks, and the tinting strength and the width of distribution per aggregate mode diameter are so controlled as not to drop below specified values (Japanese patent application Kokai publication No. 59-140241).

(3) A carbon black for rubber formulation, wherein the $N_2SA$ is 65–84 $m^2/g$, the ratio of $N_2SA$ to IA (iodine adsorption number) is in the range of 1.10–1.35, and a value defined by a formula involving the DBP of a compressed sample, blackness, IA and Stokes mode diameter of aggregate particles as variables i preset so as not to drop below a specified value (Japanese patent application Kokai publication No. 63-225639).

(4) A carbon black for rubber formulation, wherein the $N_2SA$ is 75–105 $m^2g$, the DBP of compressed sample is 110 ml/100 g or greater, the true specific gravity per unit specific surface area is preset so as to be lower than that of known carbon blacks, and the intraaggregate pore diameter and the width of distribution per aggregate mode diameter are retained at values not smaller than specified values (Japanese patent application Kokai publication No. 1-201367).

Regarding carbon blacks of N 220 class and N 110 class used as a component of large-sized tire treads of trucks and buses, the following improvements and proposals have been made.

(5) A rubber composition containing a carbon black wherein the carbon black has $N_2SA$ of 100–200 $m^2/g$ and the Stokes mode diameter distribution of aggregate is broad as compared with its particle diameter (Japanese patent application Kokai publication No. 63-112638).

(6) A rubber composition containing a carbon black, wherein the carbon black has $N_2SA$ of 70–185 $m^2/g$ and the Stokes mode diameter distribution of aggregate has two maximum points in specified ranges (Japanese patent application Kokai publication No. 63-179941).

(7) A rubber composition containing a carbon black, wherein the carbon black has $N_2SA$ of 110–155 $m^2/g$ and a value defined by a formula involving DBP, DBP of a compressed sample, blackness, $N_2SA$ and IA as variables is in a specified range (Japanese patent application Kokai publication No. 63-297439).

In spite of the many proposals mentioned above, however, an improved performance is expected of low fuel consumption tires currently is sought. That is, it is earnestly desired to develop a rubber composition of low heat build-up which exhibits an excellent abrasion resistance while retaining a high level of resilience.

SUMMARY OF THE INVENTION

It is the object of the present invention to provide a rubber composition capable of simultaneously exhibiting a sufficiently low heat build-up and a sufficiently high abrasion resistance to tire treads of various cars ranging from passenger cars to trucks and buses as to make them successfully usable as a low fuel consumption tire tread.

The above-mentioned object of the present invention can be achieved by using a rubber composition prepared by compounding 100 parts by weight of a rubber ingredient with 35–100 parts by weight of a carbon black of which the nitrogen adsorption specific surface area ($N_2SA$) is 60–160 $m^2/g$, the dibutyl phthalate absorption number (DBP) is 90–150 ml/100 g, and the intraaggregate pore mode diameter (Dp mode diameter) satisfies the following equation:

Dp mode diameter $\geq 75.2 \times (DBP/N_2SA) + 8.0$ wherein Dp mode diameter signifies a mode diameter at the maximum frequency in the intraaggregate pore diameter distribution of carbon black measured by means of a differential scanning calorimeter (DSC).

PREFERRED EMBODIMENTS OF THE INVENTION

The carbon black used in the invention has a nitrogen absorption specific surface area ($N_2SA$) of 60–160 $m^2/g$ and a dibutyl phthalate absorption number (DBP) of 90–150 ml/100 g. Furthermore, it has the following selective characteristic:

$$Dp \text{ mode diameter} \geq 75.2 \times ((DBP/N_2SA) + 8.0 \quad (I)$$

These parameters as are defined herein are measured according to the following methods.

Nitrogen adsorption specific surface area ($N_2SA$): This is measured according to ASTM D3037-88 "Standard Test Method for Carbon Black—Surface Area by Nitrogen Adsorption", Method B. As measured by this method, IRB #6 gives a result of 76 $m^2/g$.

Dibutyl phthalate absorption number (DBP): This is measured according to JIS K6221 (1982) "Testing Methods of Carbon Black for Rubber Industry, 6.1.2, Oil Absorption Number Method A". As measured by this method, IRB #6 gives a result of 99.0 ml/100 g.

Dp mode diameter: After a carbon black sample is dried according to JIS K 6221 (1982) 5 "Method for Preparation of Dry Sample", it is accurately weighed and mixed with distilled water to prepare a paste having a carbon black concentration of $0.250/cm^3$. The paste is sufficiently dispersed by means of ultrasonic wave. Within 10 minutes after the ultrasonic dispersion, the measurement of intraaggregate pore distribution is started by the use of a differential scanning calorimeter (DSC 30, manufactured by Mettler Co.). In the measurement, about 3 to 5 mg of the paste sample is taken and sealed into an aluminum container and the mass of the paste is ascertained. Then the container is set in the DSC and measurement is carried out according to the following procedures:

(1) the sample is rapidly cooled from room temperature to $-80°$ C., (2) it is heated from $-80°$ C. up to $-5°$ C. at a rate of 10 ° C./min, (3) it is heated from $-5°$ C. up to $-0.1°$ C. at a rate of 1 ° C./min and thereafter kept at $-0.1°$ C. (a temperature 0.1 ° C. lower than the freezing point of distilled water) for 10 minutes, and (4) it is slowly cooled from $-0.1°$ C. to $-8°$ C. at a rate of 1 ° C./min to record a freezing thermogram.

From the freezing thermogram obtained in step (4), the ordinates (y) at different temperatures are read out at intervals of 0.1 ° C., from which intraaggregate pore diameter (Dp) and pore distribution ($\Delta V/\Delta Vp$) are calculated according to the following equations (2) and (3):

$$Dp = (135.34/\Delta T) + 1.14 \quad (2)$$

$$\Delta V/\Delta Dp = K \times [\Delta T)\Delta T)^2/Wa] \times y \quad (3)$$

wherein $\Delta T$ is the depression of the freezing point of distilled water, $\Delta V$ is the volume of pores wherein freezing occurred in the considered temperature interval, Wa is the heat of freezing of distilled water, and K is a factor depending on the sensitivity of the DSC and the mass of sample.

These equations were derived by Brun et. al. and detailed in Thermochimica Acta, 21 (1977), pp. 59–88, "A NEW METHOD FOR THE SIMULTANEOUS DETERMINATION OF THE SIZE AND THE SHAPE OF PORES: THE THERMOPOROMETRY".

As measured according to this method, the mode Dp diameter of IRB #6 was 95.3 nm.

Among the above-mentioned characteristics of the carbon black used in the present invention, the particle diameter range represented by a nitrogen adsorption specific surface area ($N_2SA$) of 60–160 $m^2/g$ and the structure range represented by a dibutyl phthalate absorption number (DBP) of 90–150 ml/100 g belong to a hard type region of ordinary carbon black, and they constitute a precondition for giving a rubber to be compounded therewith a high abrasion resistance while allowing the rubber to retain an appropriately low heat build-up. If the nitrogen adsorption specific surface area ($N_2SA$) is smaller than 60 $m^2/g$, the abrasion resistance is remarkably deteriorated. If it exceeds 160 $m^2/g$, the dispersibility in rubber is lowered, so that the abrasion resistance of rubber cannot be improved smoothly and heat build-up increases. If the dibutyl phthalate absorption number (DBP) is smaller than 90 ml/100 g, the abrasion resistance is deteriorated; and if it exceeds 150 ml/100 g, the resistance to iceskating decreases to cause a deterioration in safety performance.

The term "Dp mode diameter" in the carbon black of the present invention refers to the average size of pores formed among the primary carbon black particles of the aggregate, formed as a result of tight fusion and bonding of the primary particles themselves, due to the complicated configuration of the aggregate. Since the Dp mode diameter is measured by dispersing carbon black in water as has been mentioned above, the Dp mode diameter thus revealed is close to that measured in a state in which carbon black is dispersed in rubber.

Another method for measuring the pore size is mercury porosimetry. However, this method is unable to determine the pore size in a state in which carbon black is dispersed in rubber, because the mercury is forced into the pores under an elevated pressure.

The measured value of the Dp mode diameter of the carbon black used in the invention is greater than that of any commercially available conventional carbon black. This makes an important characteristic feature of the carbon black of the present invention.

The carbon black of the present invention having the above-mentioned characteristics can be produced by using an oil furnace constituted of a combustion chamber, several narrow reaction zones provided coaxially with the combustion chamber, and a broad reaction zones coaxially provided in the downstream side of the narrow reaction zones. The combustion chamber has an air feed inlet provided at the furnace head in the tangential direction and a combustion burner placed in the axial direction of the furnace. Each narrow reaction zone is provided with a multiplicity of feedstock oil spray nozzles.

The conditions of combustion, such as feed rates of fuel oil and air, as well as the feed rate of feedstock oil to be introduced into the narrow reaction zones, are controlled.

The abovementioned carbon black of the invention is compounded in the usual manner into elastomers such as natural rubbers, dienic synthetic rubbers, blend rubbers prepared by compounding dienic synthetic rubbers with natural or isoprene rubbers, and the like.

The compounding ratio of the carbon black is 35-100 parts by weight per 100 parts by weight of the rubber ingredient. A vulcanizing agent, a vulcanization accelerator, an anti-oxidant, vulcanization aids, a softener, a plasticizer and the like may be appropriately added in the usual manner. By kneading the carbon black and these additives into a rubber, the rubber composition of the present invention is obtained.

Usually, the DP mode diameter of carbon black is closely related with the conditions of carbon black formation in its production process, such as reaction temperature, turbulence of combustion gas, etc., and therefore the Dp mode diameter is largely correlated with the structure and specific surface area of the resulting carbon black.

According to the study of the present inventors, the measured Dp mode diameters, $N_2SA$ and DBP of the carbon blacks today marketed are as shown in Table 1. It has been confirmed that a relation of the following equation (II) holds among these measured values and the Dp mode diameter falls within the range represented by the following formula (III):

$$Dp\ mode\ diameter = 75.2 \times (DBP/N_2SA) \qquad (II)$$

$$75.2 \times (DBP/N_2SA) - 3.0 \leq Dp\ mode\ diameter \leq 75.2 \times (DBP/N_2SA) + 3.0 \qquad (III)$$

EXAMPLES 1-3 AND COMPARATIVE EXAMPLES 1-3

Under varied conditions, three kinds of carbon blacks of the present invention were produced by using an oil furnace constituted of a combustion chamber (900 mm in diameter, 1,000 mm in length) having an air feed inlet placed tangential to and a combustion burner placed in axial to the furnace, both on the furnace head, a first-step narrow reaction zone (200 mm in diameter, 600 mm in length) coaxially connected to the combustion chamber, a second-step narrow reaction zone (160 mm in diameter, 600 mm in length) coaxially provided in the downstream side of the first-step narrow reaction zone, and a broad reaction zone (400 mm in diameter) provided coaxially in the downstream side of the second-step narrow reaction zone. As the feedstock oil, an aromatic hydrocarbon oil having a specific gravity (15/4 ° C.) of 1.073, a viscosity (Engler 40/20 ° C.) of 2.10, a toluene-insoluble content of 0.03% and a correlation coefficient (BMCI) of 140 was used. The feedstock oil was supplied to the first and second step narrow reaction zones from respective feedstock oil spray nozzles. The fuel oil supplied into the combustion burner was a hydrocarbon oil having a specific gravity (15/4 ° C.) of 0.903, a viscosity (Cst/50 ° C.) of 16.1, a carbonaceous residue weight of 5.4% and a burning point of 96 ° C.

Table 2 illustrates the conditions of the production of carbon blacks, and Table 3 illustrates the characteristic properties of the carbon blacks thus obtained. The carbon blacks used in Comparative Examples 1-3, Table 3,

TABLE 1

|  | N110 S-9 | N103 S-9H | N220 S-6 | N330 S-3 | N347 S-3H | N339 S-KH | N351 S-NH | SRB C-3 | SRB B-4 | SRB C-4 | IRB #6 |
| --- | --- | --- | --- | --- | --- | --- | --- | --- | --- | --- | --- |
| $N_2SA$ | 142 | 142 | 118 | 79 | 82 | 93 | 74 | 120 | 77 | 127 | 76 |
| DBP | 115 | 130 | 116 | 102 | 126 | 119 | 120 | 120 | 100 | 131 | 99 |
| Dp mode diameter (found) | 60.4 | 66.2 | 75.6 | 94.1 | 113.5 | 95.5 | 123.7 | 77.6 | 97.5 | 77.6 | 95.3 |
| Dp mode diameter (calcd.) | 57.9 ~63.9 | 65.8 ~71.8 | 70.9 ~76.9 | 94.1 ~110.1 | 112.6 ~118.6 | 93.2 ~99.2 | 118.9 ~124.9 | 72.2 ~78.2 | 94.5 ~100.7 | 74.6 ~80.6 | 95.0 ~101.0 |

For example, in IRB #6, the measured Dp mode diameter is 95.3 nm. This is in the range of 95.0-101.0 nm which is calculated according to formula (III) from its DBP and $N_2SA$.

On the other hand, in the carbon black of the present invention, the measured Dp mode diameter is greater than those of the conventional carbon blacks, as is apparent from the comparison of Tables (I) and (II). Presumably due to this unique character of Dp mode diameter, the rubber composition of the present invention can increase its abrasion resistance without increasing its heat build-up. Further, in the carbon black of the invention, the $N_2SA$ and DBP being in specified ranges result in the balance of its abrasion resistance and low heat build-up. This, in cooperation with the unique character of the Dp mode diameter, can simultaneously give the rubber composition of the invention a successfully lowered heat build-up and an enhanced abrasion resistance.

Next, examples of the present invention will be described.

are conventional carbon blacks of which the mode Dp diameter is not within the range specified in the present invention even though their $N_2SA$ and DBP fall in the scope specified in the present invention.

TABLE 2

| Conditions of Formation | Ex. 1 | Ex. 2 | Ex. 3 |
| --- | --- | --- | --- |
| Air feed rate ($Nm^3$/H) | 3200 | 3200 | 3200 |
| Fuel oil feed rate (kg/H) | 162 | 162 | 162 |
| Amount of air for atomization of fuel oil ($Nm^3$/H) | 300 | 300 | 300 |
| Fuel oil combustion percentage (%) | 200 | 200 | 200 |
| Feedstock feed rate in 1st stage (kg/H) | 350 | 350 | 350 |
| Feedstock feed rate in 2nd stage (kg/H) | 990 | 793 | 565 |

TABLE 3

|  | Ex. | | | Comp. Ex. | | |
| --- | --- | --- | --- | --- | --- | --- |
|  | 1 | 2 | 3 | 1[2] | 2[3] | 3[4] |
| $N_2SA$ ($m^2$/g) | 65 | 80 | 90 | 74 | 82 | 93 |
| DBP (ml/100 g) | 145 | 125 | 135 | 127 | 126 | 119 |
| Dp mode diameter (nm) | 178.1 | 127.3 | 123.7 | 130.8 | 113.5 | 98.5 |
| Dp mode diameter | 175.8 | 125.5 | 120.8 | 137.1 | 123.6 | 104.2 |

TABLE 3-continued

|  | Ex. | | | Comp. Ex. | | |
|---|---|---|---|---|---|---|
|  | 1 | 2 | 3 | 1[2)] | 2[3)] | 3[4)] |
| (calcd.)[1)] (nm) | | | | | | |

Note:
[1)] calculated from [75.2 × (DBP/$N_2$SA) + 8.0]
[2), 3), 4)] carbon blacks of Comp. Ex. 1, Comp. Ex. 2 and Comp. Ex. 3 are, respectively, commercially available N351, N347 and N339.

Next, the carbon blacks listed in Table 3 were compounded with a styrene-butadiene rubber (SBR) at the compounding ratios specified in Table 4.

Each of the compounded mixtures listed in Table 4 was vulcanized at 145° C. for 50 minutes. With the rubber compositions thus obtained, rubber characteristics were measured to obtain the results given in Table 5.

The rubber characteristics were measured in the following manner.

(1) ABRASION RESISTANCE

Abrasion wear was measured by means of a Lambourne abrasion tester with a mechanical slip mechanism under the following conditions:

test piece: 10 mm in thickness, 44 mm in outer diameter,

Emery wheel: GC type, particle size: 80-mesh, hardness: H, carborundum powder added: particle size: 80-mesh, addition rate: ca. 9 g/min, relative slip ratio between Emery wheel surface and test piece: 24%, 60%, rotation speed of test piece: 535 rpm, and test load: 4 kg.

(2) TAN δ (HYSTERESIS LOSS FACTOR)

The tan δ was measured by means of a Visco Elastic Spectrometer manufactured by Iwamoto Seisakusho Co. under the following conditions:

test piece: 2 mm in thickness, 30 mm in length, 5 mm in width,
V frequency: 50 Hz,
dynamic strain: 1.2%, and
temperature: 60° C.

(3) OTHER PROPERTIES

Other properties were measured according to JIS K 6301 "Physical Testing Methods for Vulcanized Rubber".

TABLE 4

| Compounded ingredients | Compounding ratio (parts by wt.) |
|---|---|
| Styrene-butadiene rubber (JSR 1712) | 137.5 |
| Carbon black | 68.75 |
| Stearic acid (dispersant vulcanization aid) | 1.0 |
| Zinc oxide (vulcanization aid) | 3.0 |
| N-t-Butyl-2-benzothiazyl-sulfenamide (vulcanization accelerator) | 1.38 |
| Sulfur (vulcanizing agent) | 1.75 |

TABLE 5

| Rubber characteristics | Ex. | | | Comp. Ex. | | |
|---|---|---|---|---|---|---|
|  | 1 | 2 | 3 | 1 | 2 | 3 |
| Lambourne abrasion test | | | | | | |
| 24% slip | 90 | 98 | 107 | 84 | 95 | 100 |
| 60% slip | 94 | 101 | 110 | 89 | 94 | 100 |
| tan δ (hysteresis loss factor) | 0.190 | 0.204 | 0.227 | 0.205 | 0.226 | 0.238 |
| Hardness (JIS, Hs) | 65 | 66 | 67 | 64 | 65 | 66 |
| 300% modulus (kg/cm$^2$) | 152 | 148 | 149 | 144 | 130 | 141 |
| Tensile strength (kg/cm$^2$) | 245 | 263 | 270 | 226 | 234 | 250 |
| Elongation (%) | 490 | 510 | 515 | 520 | 540 | 515 |
| Resilience (%) | 41.2 | 39.4 | 37.9 | 38.3 | 36.4 | 35.8 |

It is apparent from Table 3 that the measured values of the Dp mode diameter of the carbon blacks of the present invention (Examples 1-3) are greater than the calculated values of the Dp mode diameter. On the other hand, the measured values of the Dp mode diameter of the commercially available carbon blacks (Comparative Examples 1-3) are smaller than the calculated values of the Dp mode diameter.

It is apparent from Table 5 that, as compared with the commercially available carbon blacks, the carbon blacks of the present invention are improved with a significant difference in the result of the Lambourne abrasion test which reveals the abrasion resistant performance, even though the carbon blacks of the invention and those of the comparative examples are comparable to each other in resilience and tan δ (hysteresis loss factor), which is used as a measure of low heat build-up.

EXAMPLES 4–5 AND COMPARATIVE EXAMPLES 4–5

Under the working conditions specified in Table 6, two kinds of carbon blacks were produced, provided that the oil furnace, feedstock oil and fuel oil were the same as those of Example 1.

Table 7 illustrates the characteristic properties of the carbon blacks thus obtained. The table includes Comparative Examples 4 and 5 which are concerned with the conventional carbon blacks comparable to those of the invention in specific surface area.

Next, each of the carbon blacks was compounded into natural rubber under the compounding conditions specified in Table 8.

TABLE 6

| Condition of Formation | Ex. 4 | Ex. 5 |
|---|---|---|
| Air feed rate (Nm$^3$/H) | 3400 | 3600 |
| Fuel oil feed rate (kg/H) | 181 | 191 |
| Amount of air for atomization of fuel oil (Nm$^3$/H) | 320 | 320 |
| Fuel oil combustion percentage (%) | 190 | 190 |
| Feedstock feed rate in 1st stage (kg/H) | 360 | 300 |
| Feedstock feed rate in 2nd stage (kg/H) | 432 | 156 |

TABLE 7

| Characteristics | Ex. 4 | Ex. 5 | Comp. Ex. 4 | Comp. Ex. 5 |
|---|---|---|---|---|
| $N_2SA$ (m$^2$/g) | 110 | 154 | 118 | 142 |
| DBP (ml/100 g) | 105 | 118 | 115 | 116 |
| Dp mode diameter (nm) | 81.9 | 67.1 | 75.6 | 60.4 |
| DP Mode (calcd.) (nm)[3] | 79.8 | 65.6 | 81.3 | 69.4 |

Note: carbon blacks of Comp. Ex. 4 and Comp. Ex. 5 are, respectively commercially avialable N220 and N110.

TABLE 8

| Compounded ingredients | Compounding ratio (parts by wt.) |
|---|---|
| Natural rubber (RSS #1) | 100 |
| Carbon black | 50 |
| Aromatic oil (softener) | 4 |
| Stearic acid (dispersant vulacnization aid) | 3 |
| Zinc oxide (vulcanization aid) | 5 |
| Dibenzothiazyl disulfide (vulcanization accelerator) | 1 |
| Suflur (vulcanizing agent) | 2.5 |

The compounded mixtures listed in Table 8 were vulcanized at 145° C. for 40 minutes, and the rubber compositions thus obtained were examined for characteristic properties. The results are given in Table 9.

TABLE 9

| Rubber characteristics | Ex. 4 | Ex. 5 | Comp. Ex. 4 | Comp. Ex. 5 |
|---|---|---|---|---|
| Lambourne abrasion test | | | | |
| 24% slip | 95 | 108 | 88 | 100 |
| 60% slip | 93 | 109 | 89 | 100 |
| tan Δ (hysteresis loss factor) | 0.159 | 0.191 | 0.170 | 0.198 |
| Hardness (JIS Hs) | 65 | 70 | 67 | 68 |
| 300% modulus (kg/cm$^2$) | 170 | 170 | 185 | 173 |
| Tensile strength (kg/cm$^2$) | 287 | 329 | 289 | 310 |
| Elongation (%) | 515 | 505 | 510 | 525 |
| Resilience (%) | 52.2 | 48.3 | 49.1 | 46.9 |

It is apparent from Tables 7 and 9 that the products of Examples 4 and 5 of which the Dp mode diameters satisfy the conditions of the present invention exhibit, when compounded with a natural rubber, comparable or lower of heat build-up and higher abrasion resistance to those of the products of Comparative Examples 4 and 5 which are on the same level in specific surface area as those of Examples 4 and 5.

As has been described above, the rubber composition of the present invention is effectively improved in abrasion resistant performance while retaining a low heat build-up and an excellent resilience. Owing to both the good characteristic properties which the rubber composition of the invention simultaneously exhibits, the composition of the invention is remarkably useful as the material of tire tread for all kinds of automobiles of which are required a high speed, a high stability and a high durability under severe traveling conditions ranging from passenger cars to trucks and buses.

What is claimed is:

1. A rubber composition comprising 100 parts by weight of a rubber ingredient compounded with 35–100 parts of a carbon black, said carbon black having a nitrogen adsorption specific surface area ($N_2SA$) of 60–160 m$^2$/g and a dibutyl phthalate absorption number (DBP) of 90–150 ml/100 g, and the intraaggregate pore mode diameter (Dp mode diameter) of said carbon black satisfying the following formula:

Dp mode diameter $\geq 75.2 \times (DBP/N_2SA) + 8.0$, wherein the Dp mode diameter refers to a mode diameter at the maximum frequency in the pore diameter distribution of carbon black particles measured by means of a differential scanning calorimeter.

* * * * *